Sept. 6, 1927.
E. ROUČKA
RECORDING SYSTEM
Filed March 14, 1923    3 Sheets-Sheet 2
1,641,199
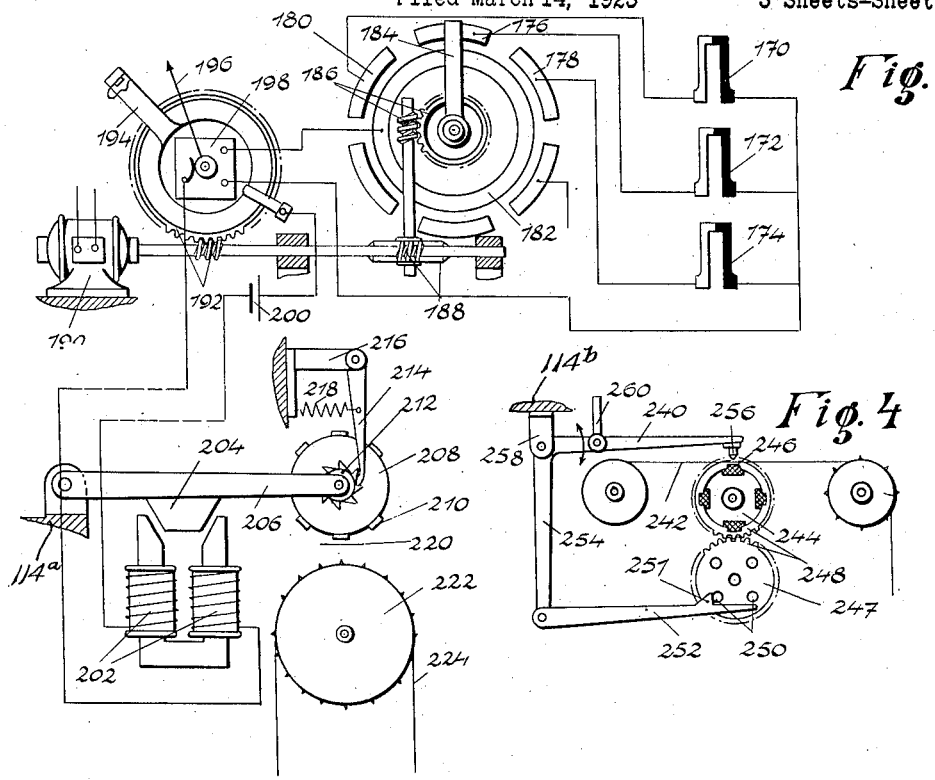
Fig. 3
Fig. 4
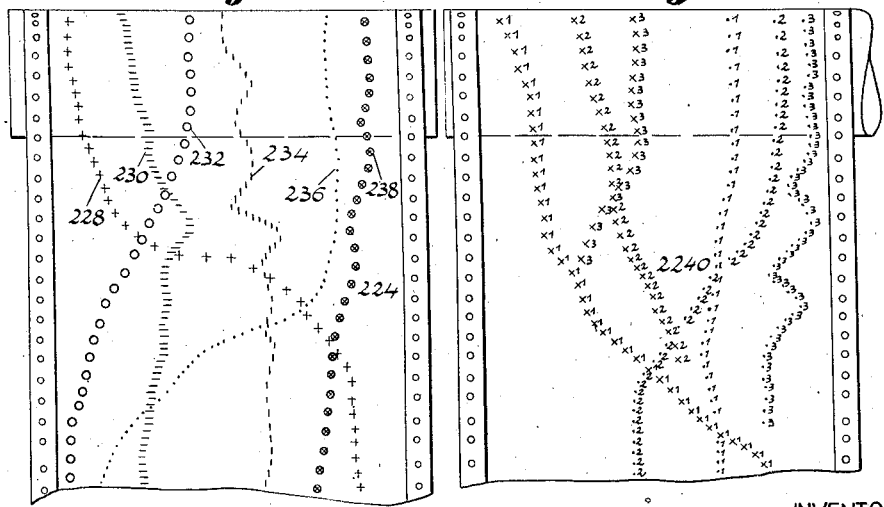
Fig. 5
Fig. 6
INVENTOR
Erich Roučka
BY
ATTORNEY Sept. 6, 1927.
E. ROUCKA
1,641,199
RECORDING SYSTEM
Filed March 14, 1923   3 Sheets-Sheet 3
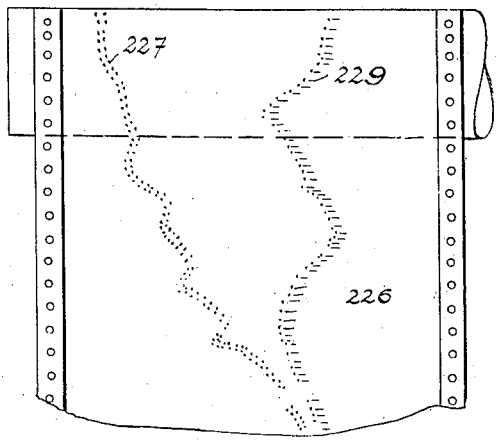
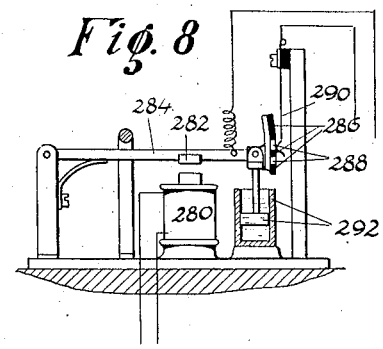
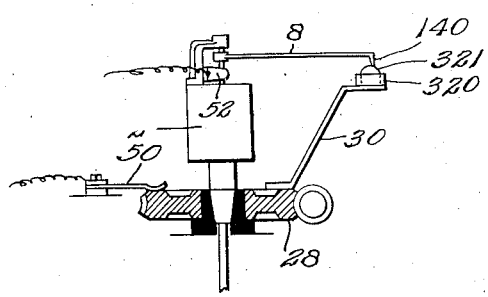
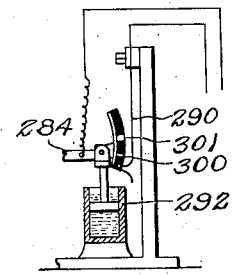
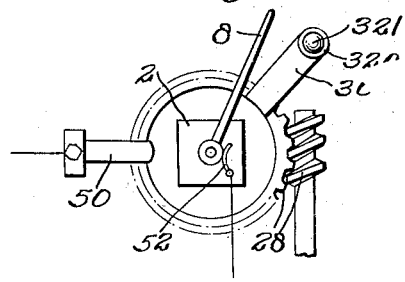
INVENTOR
Erich Roucka
BY
ATTORNEY Patented Sept. 6, 1927.

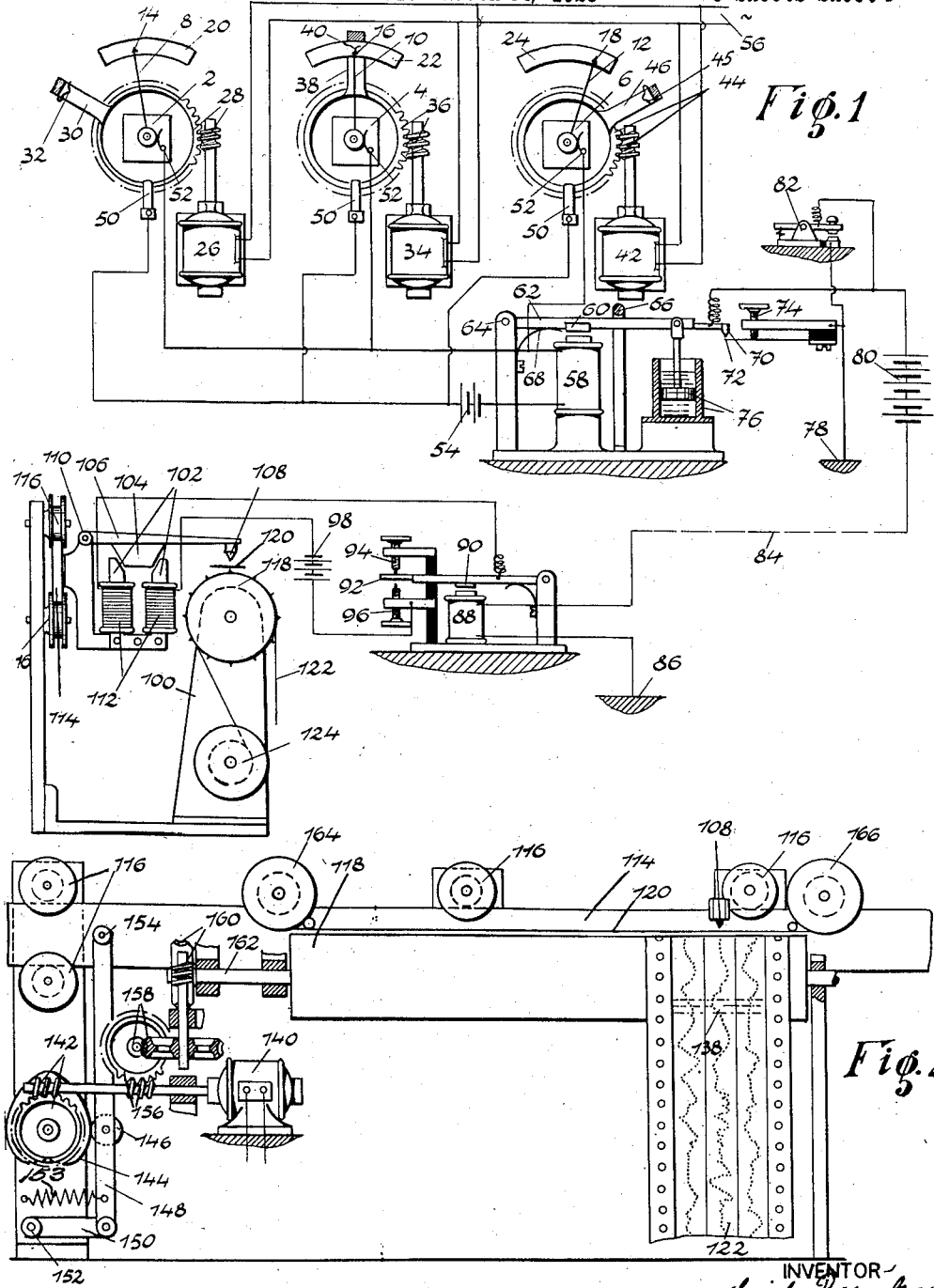

1,641,199

UNITED STATES PATENT OFFICE.

ERICH ROUČKA, OF BLANSKO, CZECHOSLOVAKIA.

RECORDING SYSTEM.

Application filed March 14, 1923, Serial No. 625,154, and in Czechoslovakia March 13, 1923.

This invention relates in general to a system for periodically recording changes or variations in conditions, quantities or qualities, or impulses of energy, etc. More particularly the invention relates to a system especially adapted for recording variations in quantities or qualities which are transmitted by sudden changes or impulses of auxiliary energy for instance as shown in my copending application Serial No. 610,387, filed January 2, 1923, where said impulses of auxiliary energy are produced in various relations to or at various time positions in regular intervals of time, the said relations or time positions of said impulses to or in corresponding time intervals being determined by the magnitude of the quantity or quality at the time of the impulse and a measure of the quantity or quality.

The primary object of the invention is to provide a system for recording a plurality of series of impulses of energy, or variations in a plurality of conditions, quantities or qualities transmitted by impulses or changes of auxiliary energy, etc., through a periodically movable means common to and controlled by all of said plurality of series of impulses, etc. In other words, the invention contemplates the producing of a plurality of individual records, one for each series of impulses, etc., through the medium of a mechanism common to or controlled by all of said series of impulses.

Further objects of the invention are to provide in such a system means for manually producing sudden changes or impulses of said auxiliary energy for signalling purposes and in which said common mechanism serves to record separately the impulses or changes of auxiliary energy produced by both the variations in the quantities, qualities or conditions, etc., and said manually operated means.

The invention contemplates the formation of the records on individual record strips, or each record on an individual field of a single record strip common to all of the records, or all of the records on a common field of a single record strip common to all of the records. The records may be produced by simple engraving, or by printing with type and an ink impregnated ribbon, or by stamping. Where the records are produced on individual record strips or individual fields of a common record strip, the records may all be formed of the same characters, and where all of the records are formed on a common field of a single record strip, each record is preferably formed of characters different from the other records.

In the accompanying drawings I have shown several systems and constructions of apparatus for carrying out my invention, but it will be understood that this is only for the purpose of illustrating the principles of the invention and that the invention is susceptible of embodiment in many other different systems and constructions of apparatus without departing from the spirit or scope of the invention.

In said drawings in which like reference characters designate the same parts throughout the several views.

Figure 1 is a diagrammatic illustration of a recording system embodying my invention utilized in connection with a plurality of systems for transmitting variations in a plurality of quantities or qualities by means of impulses or sudden changes of auxiliary electric energy, the recording apparatus being shown in end elevation;

Figure 2 is a side elevation of the recording apparatus;

Figure 2ª is an enlarged transverse vertical sectional view of a modified form of impulse producing mechanism; Figure 2ᵇ is an enlarged top plan view of the apparatus shown in Figure 2ª.

Figure 3 is a view similar to Figure 1 showing a modification of the recording apparatus used in connection with another system for transmitting variations in a plurality of quantities or qualities, portions of the recording system being omitted for clearness in illustration;

Figure 4 is a fragmentary end elevation of another modified construction of recording apparatus;

Figures 5 and 6 are fragmentary plane views of record strips showing the different characters which may be utilized for recording the plurality of records on a common field;

Figure 7 is a plan view of a record strip showing the records made up of composite characters, Figure 8 is a fragmentary diagrammatic side elevation of an apparatus for producing such composite characters as shown in Figure 7, and Figure 9 is a fragmentary side elevation of a modified arrangement of the conducting portions of the apparatus shown in Figure 8.

For the purpose of illustrating the principles of the invention I have shown the same in Figure 1 of the drawings as utilized in connection with a plurality of systems for transmitting variations in a plurality of quantities, qualities, or conditions, for instance, fluid pressure, temperature, electric current, etc., by means of sudden changes or impulses of auxiliary energy, said systems being similar to that described in my copending application filed January 2, 1923, Serial No. 610,387. Said systems comprise the respective devices 2, 4 and 6 each sensitive or responsive to variations in a quantity or quality, said devices actuating the respective hands or pointers 8, 10 and 12 in accordance with variations in the respective quantity or quality. The said hands are adapted to co-operate with means movable in regular intervals of time for producing sudden changes or impulses of an electric auxiliary energy, in the present instance the said hands being connected by the respective brushes 52 to one terminal of an electromagnet 58 the other terminal of which is connected to one terminal of a source 54 of electricity, the other terminal of which is in turn connected by the respective brushes 50 to arms 30, 38 and 46 constantly revoluble coaxially with the respective hands 8, 10 and 12 through the respective gearings 28, 36 and 44 by the respective synchronous electric motors 26, 34 and 42 which are connected to a common alternating current system 56, preferably of the time synchronized constant frequency type. Thus, the said transmitting systems are connected in parallel with the electro-magnet 58. The respective hands 8, 10 and 12 are provided with contact members 14, 16 and 18 adapted to cooperate with light spring contacts 32, 40 and 45 on the corresponding arms 30, 38 and 46 as said arms are rotated, and once during each revolution of the arms 30, 38 and 46, the corresponding contact members 32, 40 and 45 momentarily engage the respective contact members 14, 16 and 18 to close the circuit through the source 54 of electricity and energize the magnet 58. It will be understood that the apparatus including parts 2, 8, 14, 30 and 32, etc., as shown on the drawing is diagrammatically illustrative of the principles involved and other suitable apparatus for the purpose may be used. Where the hand 8 is influenced by a comparatively large amount of power, for instance when the hand is a part of a fluid pressure gauge, a good momentary electrical contact between 14 and 32 in the apparatus shown in Figure 1 of the drawings is possible without disturbance of the position of the hand 8 by movement of the contact 32. Where the hand 8 forms a part of an instrument influenced by a small or weak force, other impulse transmitting apparatus is necessary, for instance such as illustrated in Figures 2$^a$ and 2$^b$ of the drawings or as described in my copending application Serial No. 610,388, filed January 2, 1923.

In the apparatus shown in Figures 2$^a$ and 2$^b$, the contacts 14 and 32, etc., are replaced by the contact finger 140 and the cup 320 carrying mercury 321, respectively. The cup 320 is mounted on the arm 30 and the contact finger 140 on the hand 8. In operation, the mercury 321 contacts with the finger 140 with a brushing action as the arm 30 is rotated, and the friction resulting from such brushing contact is so slight as to produce little or no displacement of the hands 8, 10, 196, etc.

Said magnet cooperates with an armature lever 62 pivotally mounted at one end and carrying an armature 60, said lever being normally influenced away from said magnet by a spring 68. Thus, upon each energization of the magnet 58, the lever 62 is attracted to the magnet and thereby oscillated in one direction. The free end of said lever carries a contact point 70 adapted to cooperate with a contact strip 72 which normally engages an adjustable contact screw 74 of a circuit making and breaking mechanism. The contact point 70 is connected to one terminal of a source 80 of auxiliary electric energy, the other terminal of which is connected through a second electro-magnet 88 to the ground at 86. The contact screw 74 is connected to the ground at 78, so that when the lever 62 is oscillated into engagement with the strip 72 the circuit is closed through the source 80 and electro-magnet 88. The closing of said circuit is of short duration due to the lever 62 moving the contact strip 72 away from the screw 74. Actuation of the lever 62 by the electro-magnet 58 is restrained by a dash pot 76, and influence of said lever by the spring 68, is limited by a stop 66.

The recording mechanism embodying my invention includes the electro-magnet 88 which cooperates with an armature lever 90 carrying a contact 92 adapted to cooperate with spaced contact screws 94 and 96. Said lever 90 and one of the contact screws, here the screw 96, control a circuit through a source 98 of auxiliary electric energy and electro-magnets 112 carried by a bar 114 horizontally reciprocable between guide rollers 116 synchronously with the operation of the arms 30, 38 and 46 of the transmitting apparatus. The said electro-magnets cooperate with an armature lever 106 pivotally mounted at one end as at 110 on the bar 114, said lever carrying an armature 104 and a printing type 108. An ink impregnated ribbon 120 carried by spools 164 and 166 in known manner is arranged between the printing member 108 and a record strip 122 wound around a roller 118 from a supply roll 124 which is mounted on a fixed support 100. When the magnet 88 is energized, the circuit is closed through the source 98 which energizes the magnets 112 to attract the lever 106. The printing member 108 is thus forced against the ribbon 120 and the ribbon is forced against the record strip 122 whereby an impression is made on the said record strip.

The bar 114 is constantly reciprocated by means of a cam 144 engaging a follower roller 146 carried by a link 148 one end of which is pivotally connected at 154 to the bar 114 and the other end of which is connected by a link 150 and a pivot 152 to a fixed support. The follower roller 146 is held in engagement with the cam by means of a spring 153. The cam 144 is driven through gearing 142 from a synchronous electric motor 140 which may be connected to the same alternating current system 56 as the motors 26, etc. It will be observed that the lever 106 being carried by the bar 114 will be moved transversely of the record strip 122 synchronously with the revolution of the arms 30, etc. of the transmitting apparatus.

The record strip 122 is preferably moved by gearing 158, 160 and a shaft 162 connected to the roller 118, by the motor 140 so that the said strip is moved synchronously with the actuation of the bar 114.

In the operation of the system, the arms 30, 38 and 46 are preferably arranged at angles to each other so that the contacts 32, 14 and 40, 16 and 45, 18 are made in succession and all during one stroke of the bar 114. In the present instance said arms are arranged at angles of approximately 60° to each other so that all of the contacts 32, 14, and 40, 16, and 45, 18 are made in succession during 180° of rotation of the cam 144 and movement of the bar 114 in one direction, and the cam 144 during the remaining 180° of rotation permits return movement of the bar 114 under the influence of the spring 153. The magnet 58 is successively energized by said contacts and controls through the relay 88 the actuation of the printing member 108 of the recording apparatus so that said printing member is actuated against the record strip 122 in accordance with the impulses of auxiliary energy produced by the respective contacts 32, 14, etc. The position of the printing member 108 when said impulses occur corresponds to the time position of the impulse in the interval of time determined by one complete revolution of one of the arms 30, 38 or 46. This time position of the impulse is a function of the quantity or quality actuating the devices 2, 4 or 6 corresponding to the said arms 30, 38 or 46. With this form of apparatus an individual record is produced on the strip 122 for each of the transmitting systems 2, 30, etc., and each of the records occupies an individual field on the record strip 122.

The invention also contemplates the utilization of the recording mechanism for recording other impulses of auxiliary energy than those produced by the above described transmitting systems, for signalling purposes, such as telegraphy. Thus a telegraph sending key 82 may be connected in parallel with the circuit making and breaking mechanism 72, 70 so that the said key may open and close the circuit through the source 80 and control the relay 88, 90 independently of said circuit making and breaking mechanism 72, 70. The impulses of auxiliary energy are produced by the key 82 control actuation of the printing member 108 in exactly the same manner as the impulses produced by the transmitting systems, the duration of the impulses being controlled by the operator through the key 82. Thus, records similar to the record 138 may be produced on the record strip 122 and may comprise any suitable code, such as the Morse telegrpah code. It will be understood that the formation of the dots and dashes of such a code may be controlled by the time during which the key 82 is held closed. As abovementioned, the duration of the impulse produced by the transmitting systems is controlled by the circuit making and breaking mechanism 70, 72, 74.

It will be observed that in the construction shown in Figures 1 and 2, all of the records are produced on the record strip 122 during one stroke of the common regularly movable mechanism including the bar 114 and the cam 144. That is, all of the records are produced during one interval of time determined by one revolution of the cam 144. The invention also contemplates the production of each of a plurality of records during one stroke of the regularly movable mechanism common to all of the plurality of series of impulses, etc., and a construction for accomplishing this result is shown in Figure 3.

In the system shown in Figure 3 I have illustrated one device 198 sensitive to a quantity or quality, etc. and means for successively connecting said device with a plurality of quantities or qualities, said device cooperating with a regularly movable member 194, similar to the arms 30, etc. of the system shown in Figure 1, and said member being constantly revolved by a synchronous motor 190 through gearing 192. The device 198 is provided with a hand 196 which cooperates with a contact carried by the arm 194 for controlling the production of impulses of auxiliary electric energy from a source 200 similarly to the hands 2, etc. and arms 30, etc. of the construction of Figure 1, the said impulses being utilizied for actuating the recording mechanism.

The plurality of quantities or qualities actuating the system shown in Figure 3 are different temperatures which affect different thermo-electric cells 170, 172 and 174. The said cells are connected to the respective conducting segments 176, 178 and 180 of a distributor which also includes a collecting ring 182 and a constantly revoluble contact arm 184 driven through gearing 186 and 188 from the motor 190. The collecting ring 182 is connected to one terminal of the device 198 and the other terminal of said device 198 is connected to one terminal of each of the thermo-electric cells 170, etc. With this construction it will be observed that the device 198 will be successively thrown into circuit with the cells 170, 172 and 174 by the rotating contact arm 184. The distributor is shown as adapted to accommodate six thermo-electric cells, although only three cells are shown for clearness in illustration. An impulse of auxiliary energy from the source 200 is produced by each of the thermo-electric cells 170, etc. through cooperation of the device 198 and the member 194.

The recording mechanism comprises an armature lever 206 pivotally mounted on a regularly movable mechanism 114$^a$, such as the bar 114 of Figure 1, which is driven synchronously with the arm 194. The said lever carries an armature 204 cooperating with electro-magnets 202 connected in series with the source 200 of auxiliary electric energy. The said lever 206 also carries a drum 208 carrying on its periphery spaced printing members 210 one for each of the quantities or qualities affecting the thermo-electric cells. Said printing members are preferably different from each other and cooperate with a single record strip 224 for producing the records for all of the quantities or qualities on a common field on said record strip. The record strip is carried by a drum 222 which may be constantly driven synchronously with the arm 194 by any suitable means, such as that shown in Figure 1. The drum 208 has connected thereto a ratchet wheel 212 having a number of teeth corresponding to the printing members 210, said ratchet wheel being engaged by a pawl 214 pivotally connected to a support 216 in fixed relation to the lever 206. The said pawl is maintained in engagement with the ratchet 212 by a spring 218. An ink impregnated ribbon 220 may be interposed between the drum 208 and the record strip 224 to cooperate with the printing members 210 for making impressions on the said record strip.

In the operation of this system as illustrated, the member 194 makes one complete revolution and the bar 114$^a$ one complete reciprocation while the contact arm 184 rotates through an angle of 60°, and thus one impulse of auxiliary electric energy is produced during each complete stroke of the regularly movable mechanism or bar 114$^a$, and the electro-magnets 202 are thus energized once during each stroke of said regularly movable mechanism. Successive impulses are produced by variations of the respective quantities or qualities, once during each 60° angular movement of the contact arm 184 and each complete revolution of the member 194. Upon energization of the magnets 202 the armature lever 206 is attracted which actuates the drum 208 against the record strip 224 whereby an impression is made on said record strip by one printing member 210. When the lever 206 is returned to its normal position after energization of the magnets 202 the ratchet wheel 212 is moved one step forward by engagement with the pawl 214 so that the next successive printing member 210 is presented to the record strip. In this manner a plurality of records 228, 230, 232, 234, 236 and 238 are successively produced on the record strip 224, each of said records corresponding to one of the plurality of series of impulses or variations of the quantities or qualities.

Figure 6 shows a record strip 2240 on which the records are formed by characters different from those shown by Figure 5.

In Figure 4 of the drawings I have shown a modified form of recording apparatus which includes a bell crank lever 240 pivotally connected at 258 to the regularly movable mechanism 114$^a$ similar to the bar 114, and oscillated through a link 260 in accordance with the impulses of auxiliary electric energy. The said bell crank lever 240 carries on one of its arms a printing member 256 adapted to cooperate with differently colored inking pads or the like 246 arranged in spaced relation on a drum 244. In this form of apparatus the record strip 242 is passed between the printing member 256 and the drum 244 so that the printing member forces the record strip into engagement with the pads 246 to produce the impression on the record strip. The drum 244 is rotated step by step in accordance with the successive impulses by means of a link 252 connected to the other arm 254 of the bell crank lever 240 and carrying a shoulder 251 adapted to engage pins 250 projecting from a pinion 247 meshing with a pinion on the drum 244. Upon each oscillation of the lever 240 the pinion 247 is rotated one step by the link 252 which in turn rotates the drum 244 one step, and the pins 250 are arranged so that upon each impulse a different pad 246 is presented to the printing member 256. The drum shown in the drawings is adapted to produce four records, but obviously the number of pads 246 and pins 250 may be varied as desired to produce more or less records.

In accordance with the invention the records may be formed of composite characters such as shown in Figure 7. These characters may comprise, for instance, a plurality of dots, or a dot and a dash, or two dashes, etc. An apparatus for producing such composite characters is shown in Figure 8 of the drawings, said apparatus comprising an electro-magnet 280 which may be connected in circuit with a source of electric energy, similarly to the magnet 58 of the system shown in Figure 1, and energized successively by the plurality of quantities or qualities, etc. Said magnet 280 cooperates with an armature lever 284 carrying an armature 282 and a segment formed of alternate conducting and insulating portions 288 and 286 respectively. The said segment is concentric with the axis of the lever 284 and is engaged by a spring contact 290. The contact 290 is connected to one terminal of a source of auxiliary electric energy and the recording mechanism, for instance the magnets 112 or 202 of the systems shown in the respective Figures 1 or 3. The lever 284 is also connected in said circuit. With this construction when the magnet 280 is energized the armature lever 284 is oscillated and causes successive engagements of the conducting portions 288 with the contact strip 290, and the printing member of the recording system is actuated in accordance with the opening and closing of the circuit through the electro-magnets 202 or 112 by the conducting portions 288 and insulating portions 286. For instance, if the printing member is a pointed element the same may be actuated twice in rapid succession to produce two spaced dots as indicated at 227, it being understood that by varying the size and movement of the conducting portions 288 the record characters may be varied at will. For instance, a small and a large conducting portion 300 and 301, respectively, as shown in Figure 9 would produce a character consisting of a dot and a dash as indicated at 229, the small conducting portion forming the dot and the large portion the dash.

While I have shown and described my invention used in connection with certain systems for remotely transmitting variations in quantities or qualities, it will be understood that it is within the scope of the invention to utilize the recording system for any desired purpose for which it is adapted. Also, I do not desire to be understood as limiting myself to the particular construction of regularly movable mechanism common to the plurality of series of impulses, etc., or to the particular construction of printing or recording apparatus described. Further, the invention contemplates utilizing one printing member, such as 108 in Figure 1 of the drawings, for each of a plurality of series of impulses, said member being regularly movable by suitable means, such as the bar 114, etc.

Having thus described the invention, what I claim is:

1. A recording apparatus for use with a system for transmitting a plurality of variable conditions wherein impulses of auxiliary energy are successively produced at points in cycles of regular intervals of time corresponding to the magnitudes of the respective conditions being transmitted comprising a record element, and means common to all of said conditions movable in regular cycles synchronously with the cycles in which said impulses are produced and actuated by said impulses of auxiliary energy to cooperate with said record element to successively produce a plurality of records one for each of said plurality of conditions to be recorded.

2. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, and means common to all of said conditions movable in regular cycles relatively to said record element in one direction synchronously with said cycles in which said impulses are produced and operated by said impulses of auxiliary energy in another direction to cooperate with said record element to successively produce a plurality of records on said recording element one for each of said conditions to be recorded.

3. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, a recording member common to all of said conditions normally spaced from said record element and operated by said impulses into engagement with said element to make a record thereon, and means movable in regular cycles synchronously with said cycles in which said impulses are produced for producing relative movement of said record element and said recording member whereby a plurality of records are produced on said record element one for each of said conditions to be recorded.

4. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, means regularly movable in cycles synchronously with said cycles in which said impulses are produced, and means succesively operated by all of said impulses of auxiliary energy to cooperate with said movable means to produce successively during each cycle of operation of said regularly movable means records of the time positions of said impulses of auxiliary energy in corresponding intervals of time for each of said conditions to be recorded.

5. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, a recording member common to all of said conditions normally spaced from said record element and operated by said impulses into engagement with said element to make a record thereon, and means regularly movable in cycles synchronously with said cycles in which said impulses are produced for producing relative movement of said record element and said recording member to produce successively during each cycle of operation of said regularly movable means records of the time positions of said impulses of auxiliary energy in corresponding intervals of time for each of said conditions to be recorded.

6. The system set forth in claim 2 in which the recording device includes a different character for each of said records, and with the addition of means for successively bringing said characters into operative position in accordance with the production of the impulses of auxiliary energy for the respective conditions.

7. The system set forth in claim 3 in which the recording device includes a different character for each of said records, and with the addition of means for successively bringing said characters into operative position in accordance with the production of the impulses of auxiliary energy for the respective conditions.

8. A recording apparatus for use with a system for transmitting a plurality of variable conditions wherein impulses of auxiliary energy are successively produced at points in cycles of regular intervals of time corresponding to the magnitudes of the respective conditions being transmitted, comprising means controlled by said impulses of auxiliary energy for producing synchronized changes or impulses of other auxiliary energy, a record element, and means common to all of said conditions movable in regular cycles synchronously with said cycles in which said first-mentioned impulses are produced and actuated by said second-named impulses of auxiliary energy to cooperate with said record element to successively produce a plurality of records one for each of said plurality of conditions to be recorded.

9. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record strip, means having a plurality of different printing elements one for each of said conditions and normally spaced from said record strip, means operated successively by all of said impulses of auxiliary energy to cause engagement of one of said printing elements with said strip to make a record, means for actuating the first-mentioned means to successively present said printing elements to said record strip, and means regularly movable in cycles synchronously with said cycles in which said impulses are produced for producing relative movement of said record strip and said printing elements in cycles synchronous with said first-named cycles whereby a record is produced during each of said cycles of the time positions of the impulses of auxiliary energy in corresponding intervals of time for each of said conditions.

10. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, a recording device operated by said impulses of energy to produce a record on said record element, and means for producing relative movement of said recording device and said record element in cycles of regular intervals of time synchronous with said cycles in which said impulses are produced, whereby said recording member produces a record on said record element of the time positions of all of said impulses in corresponding intervals of time.

11. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, a recording member operated successively by all of said impulses of energy to produce a record on said record element, and means for producing relative movement of said recording member and said recording element in cycles of regular intervals of time synchronous with said cycles in which impulses are produced, whereby said recording member produces a record on said record element of the time positions of all of said impulses in corresponding intervals of time.

12. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, a recording device normally spaced from said record element and operated successively by all of said impulses of energy into engagement with said record element to make a record, and means for moving said recording device over said record element in cycles of regular intervals of time synchronous with said cycles in which said impulses are produced, whereby said recording device engages said record element at different points corresponding with the time positions in corresponding intervals of time of the impulses actuating the recording device.

13. A recording apparatus for use with a system for transmitting a plurality of variable conditions wherein impulses of auxiliary energy are successively produced at points in cycles of regular intervals of time corresponding to the magnitudes of the respective conditions being transmitted, comprising a record element, and means successively operated by all of said impulses of energy and regularly movable in cycles synchronously with said cycles in which said impulses are produced to produce successively a plurality of records on said record element one for the time position of each of said impulses in the corresponding interval of time.

ERICH ROUČKA.